US012626579B2

(12) United States Patent
Brown et al.

(10) Patent No.: US 12,626,579 B2
(45) Date of Patent: May 12, 2026

(54) REMOTELY IDENTIFYING POTENTIAL SYSTEM INSTABILITY BASED ON JITTER IN SCHEDULED INTERACTIONS

(71) Applicant: DELL PRODUCTS L.P., Round Rock, TX (US)

(72) Inventors: Michael Emery Brown, Austin, TX (US); Shrinidhi Katte, Bangalore (IN); Ravishankar Kanakapura N, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 68 days.

(21) Appl. No.: 18/646,942

(22) Filed: Apr. 26, 2024

(65) Prior Publication Data

US 2025/0336281 A1     Oct. 30, 2025

(51) Int. Cl.
| | |
|---|---|
| *G08B 21/18* | (2006.01) |
| *H04L 43/087* | (2022.01) |
| *H04L 43/16* | (2022.01) |

(52) U.S. Cl.
CPC .......... *G08B 21/182* (2013.01); *H04L 43/087* (2013.01); *H04L 43/16* (2013.01)

(58) Field of Classification Search
CPC ...... G08B 21/182; H04L 43/087; H04L 43/16
USPC ....................................................... 340/540
See application file for complete search history.

(56) References Cited

U.S. PATENT DOCUMENTS

| | | | |
|---|---|---|---|
| 6,452,950 B1 * | 9/2002 | Ohlsson ................ | H04J 3/0632 |
| | | | 370/519 |
| 11,916,770 B2 * | 2/2024 | Pathikonda ........... | H04L 43/065 |
| 2002/0167911 A1 * | 11/2002 | Hickey ................. | H04L 67/564 |
| | | | 370/252 |
| 2003/0048812 A1 * | 3/2003 | Gross ...................... | H04L 1/205 |
| | | | 370/389 |
| 2007/0041329 A1 * | 2/2007 | Schine ................... | H04L 43/087 |
| | | | 370/252 |
| 2007/0140306 A1 * | 6/2007 | Klein ...................... | H04L 43/16 |
| | | | 370/516 |
| 2008/0063149 A1 * | 3/2008 | West .................... | H04M 3/2236 |
| | | | 379/1.03 |
| 2019/0116106 A1 * | 4/2019 | Mulkey ............... | H04L 43/0829 |
| 2020/0382402 A1 * | 12/2020 | Kolar .................... | H04L 41/147 |
| 2020/0412659 A1 * | 12/2020 | Arditti Ilitzky ....... | H04L 43/087 |
| 2022/0029906 A1 * | 1/2022 | Mahesh .................. | H04L 41/40 |

* cited by examiner

*Primary Examiner* — Zhen Y Wu
(74) *Attorney, Agent, or Firm* — Jackson Walker L.L.P.

(57) ABSTRACT

Techniques for remotely identifying potential system instability based on jitter in scheduled interactions are described. One example method includes identifying a scheduled interaction between a computing device and a remote host, wherein the computing device and the remote host are communicatively coupled over a network, and wherein the scheduled interaction includes the computing device repeatedly receiving a message over the network from the remote host at a regular time interval; identifying arrival times of messages received from the remote host over a plurality of cycles of the scheduled interaction; calculating a jitter metric for the scheduled interaction over the plurality of cycles based on the arrival times of the messages; determining that the jitter metric exceeds a pre-configured jitter threshold; and generating an alert indicating that a potential system instability condition exists on the remote host.

17 Claims, 3 Drawing Sheets

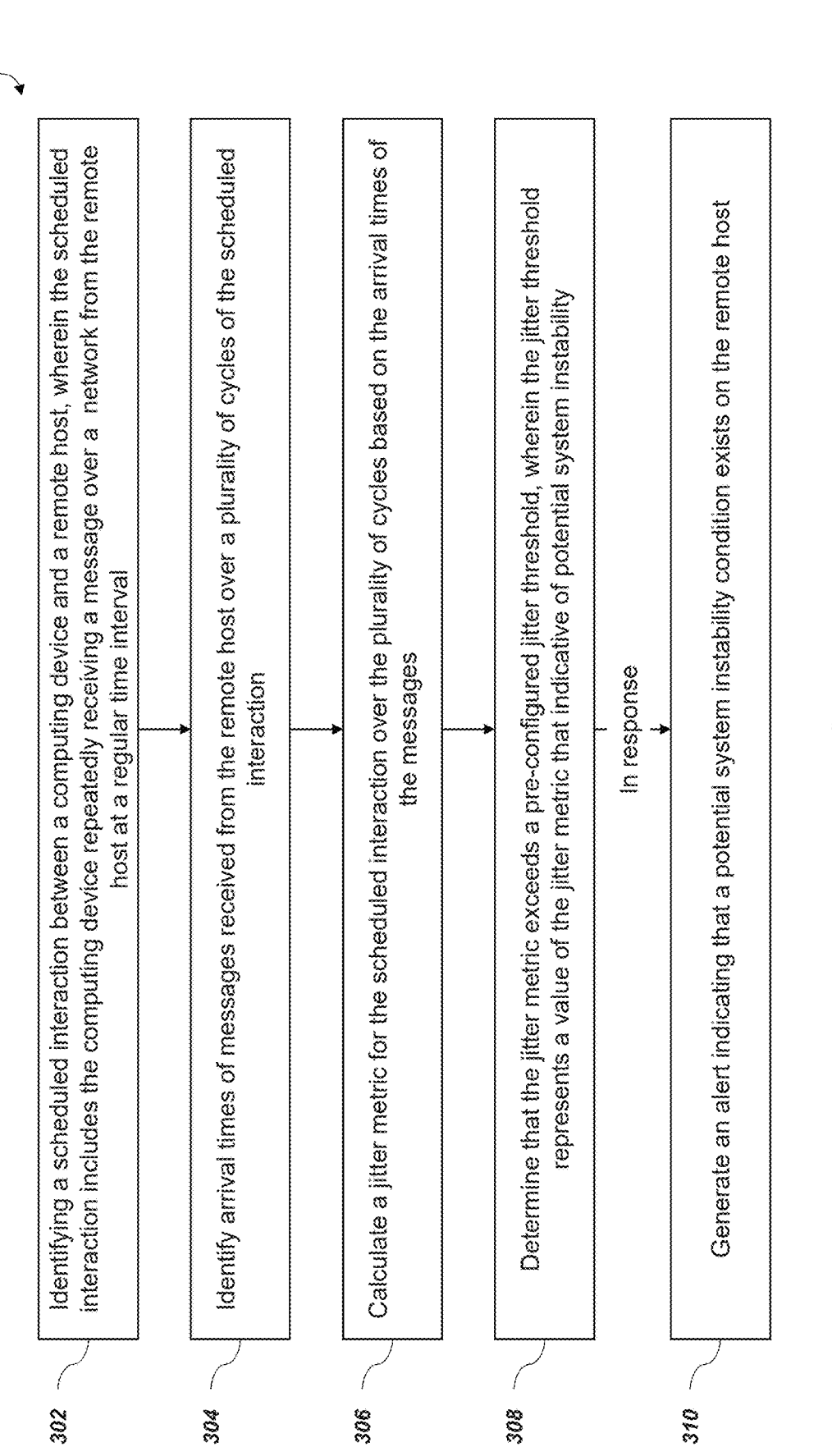

300

302 — Identifying a scheduled interaction between a computing device and a remote host, wherein the scheduled interaction includes the computing device repeatedly receiving a message over a network from the remote host at a regular time interval 304 — Identify arrival times of messages received from the remote host over a plurality of cycles of the scheduled interaction 306 — Calculate a jitter metric for the scheduled interaction over the plurality of cycles based on the arrival times of the messages 308 — Determine that the jitter metric exceeds a pre-configured jitter threshold, wherein the jitter threshold represents a value of the jitter metric that indicative of potential system instability In response 310 — Generate an alert indicating that a potential system instability condition exists on the remote host

FIG. 3

REMOTELY IDENTIFYING POTENTIAL SYSTEM INSTABILITY BASED ON JITTER IN SCHEDULED INTERACTIONS

TECHNICAL FIELD

The present disclosure relates in general to information handling systems, and more particularly to techniques for remotely identifying potential system instability based on jitter in scheduled interactions in information handling systems.

BACKGROUND OF THE INVENTION

In distributed systems (e.g., information handling systems), individual computing devices may be monitored in order to identify and troubleshoot potential issues. Such potential issues may include, for example, hardware failures, software issues such as bugs or crashes, network connectivity issues, and the like. In some cases, this monitoring may be performed automatically by a server remote from the computing device based on identifying and analyzing network activity of the computing device. For example, the computing device may be configured to periodically send a heartbeat or watchdog message to the remote server at regular intervals, such as every 60 seconds. If the remote server receives these messages from the device, it may infer that the device is still operational. But if the remote server fails to receive a heartbeat message from the device within a certain amount of time from when the message is expected, the remote server may infer that the device has failed and take corrective action, such as removing the device from the system, notifying system administrators of the issue, and the like.

SUMMARY OF THE INVENTION

In accordance with embodiments of the present disclosure, a method for remotely identifying potential system instability based on jitter in scheduled interactions includes identifying a scheduled interaction between the computing device and a remote host, wherein the computing device and the remote host are communicatively coupled over a network, and wherein the scheduled interaction includes the computing device repeatedly receiving a message over the network from the remote host at a regular time interval; identifying arrival times of messages received from the remote host over a plurality of cycles of the scheduled interaction; calculating a jitter metric for the scheduled interaction over the plurality of cycles based on the arrival times of the messages; determining that the jitter metric exceeds a pre-configured jitter threshold, wherein the jitter threshold represents a value of the jitter that metric indicative of potential system instability; and in response to determining that the jitter metric exceeds the jitter threshold, generating an alert indicating that a potential system instability condition exists on the remote host.

In some cases, the scheduled interaction includes a watchdog message received from the remote host at regular time intervals.

In some implementations, the jitter metric includes identifying an elapsed time between each of the plurality of messages and a previous message received in the previous cycle of the scheduled interaction.

In some implementations, calculating the jitter metric includes calculating an average time variation for the plurality of messages based on the identified elapsed times.

In some cases, calculating the jitter metric includes determining a number of the identified elapsed times that exceed a threshold time.

In some implementations, the method further includes in response to generating the alert indicating that the potential system instability condition exists on the remote host, instructing the remote host to mark and save a copy of its log file.

In some cases, the method further includes providing a telemetry data stream including the jitter metric to a data analytics system.

In accordance with embodiments of the present disclosure, a system for remotely identifying potential system instability based on jitter in scheduled interactions includes a computing device including at least one processor and a memory, and configured to perform operations including identifying a scheduled interaction between the computing device and a remote host, wherein the computing device and the remote host are communicatively coupled over a network, and wherein the scheduled interaction includes the computing device repeatedly receiving a message over the network from the remote host at a regular time interval; identifying arrival times of messages received from the remote host over a plurality of cycles of the scheduled interaction; calculating a jitter metric for the scheduled interaction over the plurality of cycles based on the arrival times of the messages; determining that the jitter metric exceeds a pre-configured jitter threshold, wherein the jitter threshold represents a value of the jitter metric that indicative of potential system instability; and in response to determining that the jitter metric exceeds the jitter threshold, generating an alert indicating that a potential system instability condition exists on the remote host.

In accordance with embodiments of the present disclosure, an article of manufacture includes a non-transitory, computer-readable medium having computer-executable instructions thereon that are executable by a processor of a computing device to perform operations for optimized operating system image deployment including identifying a scheduled interaction between the computing device and a remote host, wherein the computing device and the remote host are communicatively coupled over a network, and wherein the scheduled interaction includes the computing device repeatedly receiving a message over the network from the remote host at a regular time interval; identifying arrival times of messages received from the remote host over a plurality of cycles of the scheduled interaction; calculating a jitter metric for the scheduled interaction over the plurality of cycles based on the arrival times of the messages; determining that the jitter metric exceeds a pre-configured jitter threshold, wherein the jitter threshold represents a value of the jitter metric that indicative of potential system instability; and in response to determining that the jitter metric exceeds the jitter threshold, generating an alert indicating that a potential system instability condition exists on the remote host.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE SEVERAL VIEWS OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a flow chart of an example process for remotely identifying potential system instability based on jitter in scheduled interactions, in accordance with embodiments of the present disclosure.

DETAILED DESCRIPTION OF THE INVENTION

The present disclosure describes techniques for remotely identifying potential system instability based on jitter in scheduled interactions in information handling systems.

As discussed above, remote monitoring techniques often employ relatively simple schemes to infer whether a monitored device is operational, such as, for example, inferring that the device is operational if a regularly scheduled message is received over the network within a certain time window of when the message is expected. But such simple schemes may not detect an issue until the device fails completely and stops sending scheduled messages, when in reality the performance of the device may have been dropping for some time before the ultimate failure.

The present techniques enable identification of devices with potential issues prior to a such a failure by analyzing the variation in receipt times of scheduled messages over time. For example, as described in greater detail below, a device may be configured to send a "watchdog pet" message every 60 seconds to ensure that the device is operational. If the device is operating properly, each message will be received by a monitoring or management system associated with the device roughly 60 seconds after the previous message. For example, assume a first scheduled message is received by the management system at a time T, a second scheduled message is received at time T+60 seconds, and a third message is received T+60 seconds. In this example, the computing device is likely operational, because it is able to send these scheduled messages with very little deviation from the configured schedule.

However, if the device is not operating properly (e.g., due to a high processing load), the messages may be received later than expected. For example, assume a first scheduled message is received by the management system at a time T, a second scheduled message is received at time T+62 seconds, and a third message is received T+65 seconds. In this scenario the amount of time elapsed between messages deviates from the expected schedule, with the second message being 2 seconds late, and the third message being 5 seconds late relative to the schedule. The present techniques enable the system to monitor and identify these variations from the expected arrival time of each message—a phenomenon generally referred to as "jitter." For example, the system may analyze these variances from the expected receipt times and infer that the device from which the messages were received is operating in a degraded performance state, and is therefore likely to fail soon. In this way, potential issues can be identified sooner, and steps may be taken to prevent the potential issues from affecting the system as a whole. Such steps may include notifying administrators of the issue to allow them to troubleshoot the problem, reconfiguring the system to route requests away from the particular device, and the like.

Figure 1:
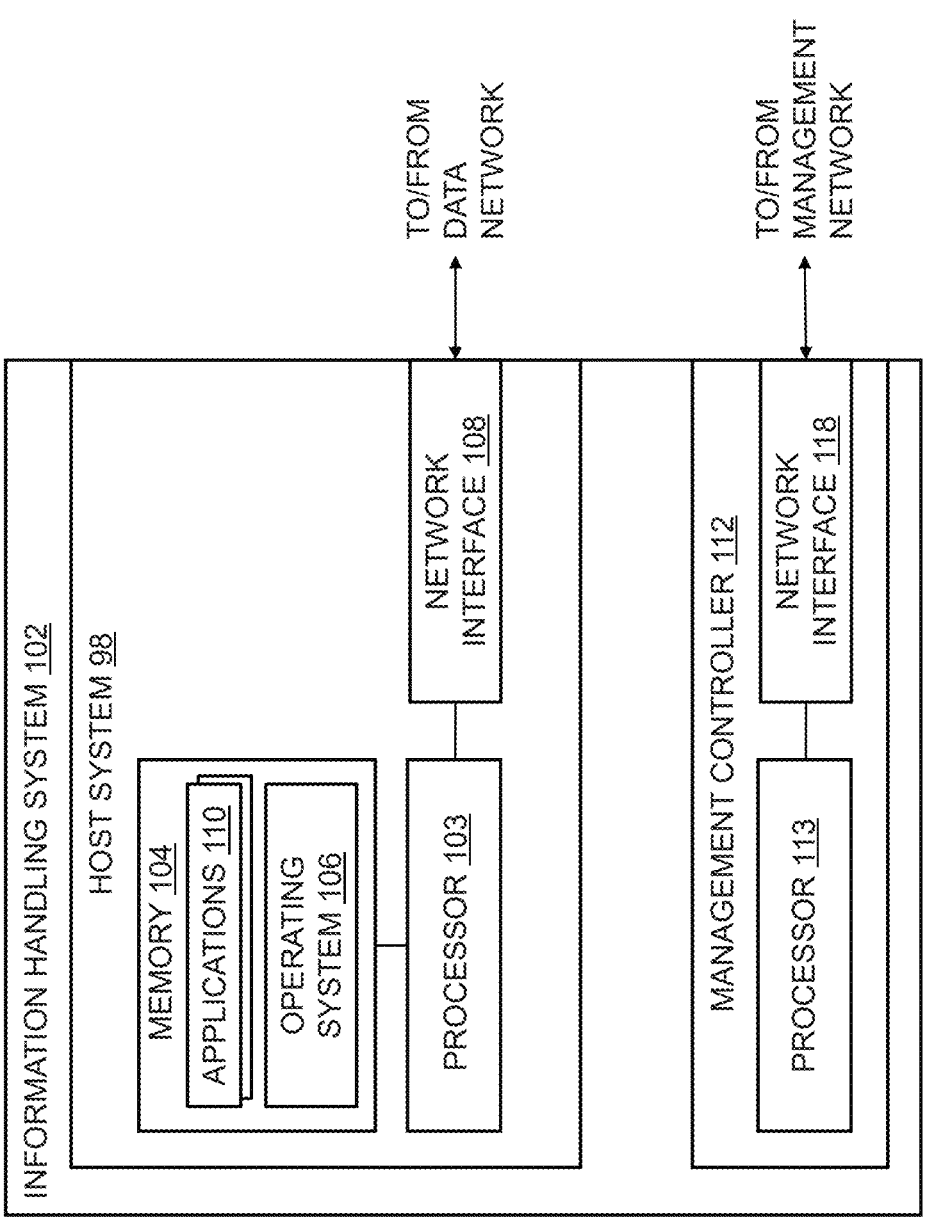
FIG. 1 illustrates a block diagram of an example information handling system, in accordance with embodiments of the present disclosure.
Figure 2:
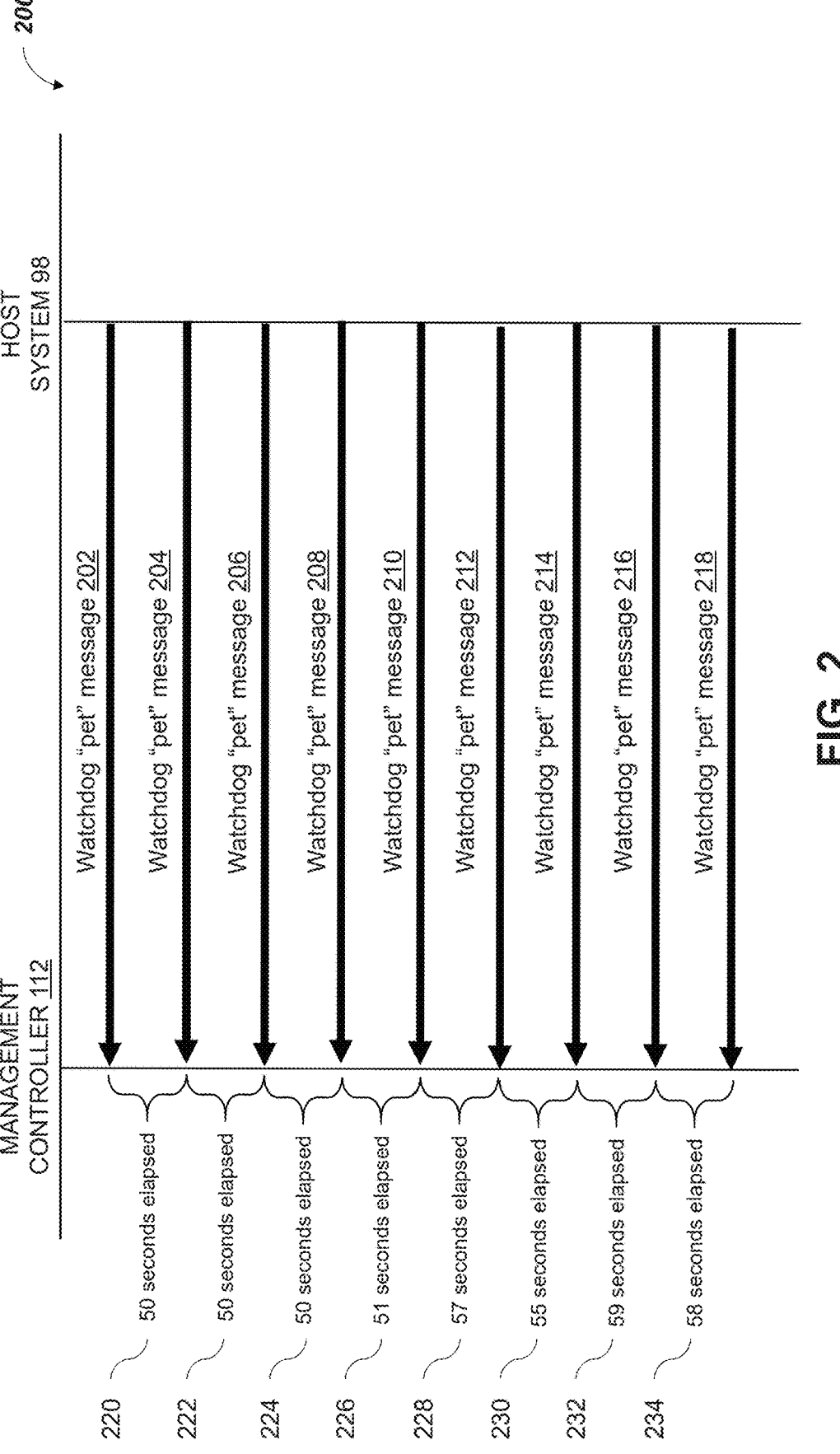
FIG. 2 illustrates a block diagram of example components of a system for remotely identifying potential system instability based on jitter in s scheduled interactions, in accordance with embodiments of the present disclosure.

Preferred embodiments and their advantages are best understood by reference to FIGS. 1 through 3, wherein like numbers are used to indicate like and corresponding parts.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103 (e.g., via a management network).

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

FIG. 2 illustrates a swim-lane diagram of an example interaction 200 for remotely identifying potential system instability based on jitter in scheduled interactions, in accordance with embodiments of the present disclosure. Note that management controller 112 and host system 98 in FIG. 2 refer to the identically numbered components from FIG. 1 discussed above.

Interaction 200 involves a host system 98 that is configured to send a "watchdog pet" message to the management controller every 50 seconds. FIG. 2 depicts 9 watchdog pet messages 202-218 sent from the host system 98 to the management controller under this configuration. Time intervals 220-234 illustrate the intervals of time between the management controller 112 receiving a particular watchdog pet message and receiving the next watchdog pet message from host system 98. As shown, for intervals 220, 222, and 224, the time interval between messages is 50 seconds.

Since 50 seconds is the expected time between messages, and intervals 220, 222, and 224 match that expected time, the management controller 112 may infer that host system 98 is operational or in a stable state.

For intervals 226-234, however, the time between messages is not 50 seconds as expected. In fact, the size of the intervals 226-234 vary widely, from 51 seconds at interval 226 to 59 seconds at interval 232. The management controller 112 may analyze this sequence intervals and determine whether, either individually or as a whole, the intervals indicate a potential instability issue with respect to host system 98. In some cases, the management controller 112 may compare the variance (i.e., the number of seconds over the configured delay) to a pre-determined threshold to determine whether a potential stability issue exists. For example, if the configured threshold were 5 seconds, the management controller 112 may generate an alert and perform other corrective action at interval 228 because the variance for that interval (7 seconds) is greater than the threshold (5 seconds).

In some cases, the management controller 112 may perform statistical analysis on the set of intervals 220-234 to determine whether the variances that begin at interval 226 are indicative of a potential stability issue on host 98. In some implementations, the time variances for the intervals 220-234 may be provided by the management controller 112 as a telemetry data stream to other systems for further analysis, such as, for example, a data analytics system (not shown).

FIG. 3 illustrates a flow chart of an example process 300 for remotely identifying potential system instability based on jitter in scheduled interactions, in accordance with embodiments of the present disclosure. In some implementations, the process 300 may be performed in the context of the systems of FIGS. 1 and 2.

As shown, at 302, a scheduled interaction between the computing device and a remote host is identified, wherein the computing device and the remote host are communicatively coupled over a network, and wherein the scheduled interaction includes the computing device repeatedly receiving a message over the network from the remote host at a regular time interval.

At 304, arrival times of messages received from the cycles of the scheduled remote host over a plurality of interaction are identified.

At 306, a jitter metric is calculated for the scheduled interaction over the plurality of cycles based on the arrival times of the messages.

At 308, it is determined that the jitter metric exceeds a pre-configured jitter threshold, wherein the jitter threshold represents a value of the jitter metric that indicative of potential system instability.

At 310, in response to determining that the jitter metric exceeds the jitter threshold, an alert is generated indicating that a potential system instability condition exists on the remote host.

In some cases, the scheduled interaction includes a watchdog message received from the remote host at regular time intervals.

In some implementations, the jitter metric includes identifying an elapsed time between each of the plurality of messages and a previous message received in the previous cycle of the scheduled interaction.

In some implementations, calculating the jitter metric includes calculating an average time variation for the plurality of messages based on the identified elapsed times.

In some cases, calculating the jitter metric includes determining a number of the identified elapsed times that exceed a threshold time.

In some implementations, the method further includes in response to generating the alert indicating that the potential system instability condition exists on the remote host, instructing the remote host to mark and save a copy of its log file.

In some cases, the method further includes providing a telemetry data stream including the jitter metric to a data analytics system.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method comprising:
   identifying, by a computing device, a scheduled interaction between the computing device and a remote host, wherein the computing device and the remote host are communicatively coupled over a network, and wherein the scheduled interaction includes the computing device repeatedly receiving a message over the network from the remote host at a regular time interval;
   identifying, by the computing device, arrival times of messages received from the remote host over a plurality of cycles of the scheduled interaction;
   calculating, by the computing device, a jitter metric for the scheduled interaction over the plurality of cycles based on the arrival times of the messages;
   determining, by the computing device, that the jitter metric exceeds a jitter threshold, wherein the jitter threshold represents a value of the jitter metric that is indicative of potential system instability;

in response to determining that the jitter metric exceeds the jitter threshold, generating, by the computing device, an alert indicating that a potential system instability condition exists on the remote host; and in response to generating the alert indicating that the potential system instability condition exists on the remote host, instructing, by the computing device, the remote host to mark and save a copy of a log file.

2. The method of claim 1, wherein the scheduled interaction includes a watchdog message received from the remote host at regular time intervals.

3. The method of claim 1, wherein calculating the jitter metric includes identifying an elapsed time between each of the plurality of messages and a previous message received in the previous cycle of the scheduled interaction.

4. The method of claim 3, wherein calculating the jitter metric includes calculating an average time variation for the plurality of messages based on the identified elapsed times.

5. The method of claim 4, wherein calculating the jitter metric includes determining a number of the identified elapsed times that exceed a threshold time.

6. The method of claim 1, further comprising:

providing, by the computing device, a telemetry data stream including the jitter metric to a data analytics system.

7. A system comprising:

a computing device including at least one processor and a memory, and configured to perform operations including:

identifying a scheduled interaction between the computing device and a remote host, wherein the computing device and the remote host are communicatively coupled over a network, and wherein the scheduled interaction includes the computing device repeatedly receiving a message over the network from the remote host at a regular time interval;

identifying arrival times of messages received from the remote host over a plurality of cycles of the scheduled interaction;

calculating a jitter metric for the scheduled interaction over the plurality of cycles based on the arrival times of the messages;

determining that the jitter metric exceeds a jitter threshold, wherein the jitter threshold represents a value of the jitter metric that is indicative of potential system instability;

in response to determining that the jitter metric exceeds the jitter threshold, generating an alert indicating that a potential system instability condition exists on the remote host; and in response to generating the alert indicating that the potential system instability condition exists on the remote host, instructing the remote host to mark and save a copy of a log file.

8. The system of claim 7, wherein the scheduled interaction includes a watchdog message received from the remote host at regular time intervals.

9. The system of claim 7, wherein calculating the jitter metric includes identifying an elapsed time between each of the plurality of messages and a previous message received in the previous cycle of the scheduled interaction.

10. The system of claim 9, wherein calculating the jitter metric includes calculating an average time variation for the plurality of messages based on the identified elapsed times.

11. The system of claim 10, wherein calculating the jitter metric includes determining a number of the identified elapsed times that exceed a threshold time.

12. The system of claim 7, further comprising:

providing a telemetry data stream including the jitter metric to a data analytics system.

13. An article of manufacture comprising a non-transitory, computer-readable medium having computer-executable instructions thereon that are executable by a processor of a computing device to perform operations comprising:

identifying a scheduled interaction between the computing device and a remote host, wherein the computing device and the remote host are communicatively coupled over a network, and wherein the scheduled interaction includes the computing device repeatedly receiving a message over the network from the remote host at a regular time interval;

identifying arrival times of messages received from the remote host over a plurality of cycles of the scheduled interaction;

calculating a jitter metric for the scheduled interaction over the plurality of cycles based on the arrival times of the messages;

determining that the jitter metric exceeds a jitter threshold, wherein the jitter threshold represents a value of the jitter metric that is indicative of potential system instability;

in response to determining that the jitter metric exceeds the jitter threshold, generating an alert indicating that a potential system instability condition exists on the remote host; and in response to generating the alert indicating that the potential system instability condition exists on the remote host, instructing the remote host to mark and save a copy of a log file.

14. The article of claim 13, wherein the scheduled interaction includes a watchdog message received from the remote host at regular time intervals.

15. The article of claim 13, wherein calculating the jitter metric includes identifying an elapsed time between each of the plurality of messages and a previous message received in the previous cycle of the scheduled interaction.

16. The article of claim 15, wherein calculating the jitter metric includes calculating an average time variation for the plurality of messages based on the identified elapsed times.

17. The article of claim 16, wherein calculating the jitter metric includes determining a number of the identified elapsed times that exceed a threshold time.

*     *     *     *     *